(12) United States Patent
Liang et al.

(10) Patent No.: US 11,391,990 B2
(45) Date of Patent: Jul. 19, 2022

(54) TOTAL REFLECTION DISPLAY DEVICE AND PLASTIC FRAME COMPONENT

(71) Applicants: Beijing BOE Optoelectronics Technology Co., Ltd., Beijing (CN); BOE TECHNOLOGY GROUP CO., LTD., Beijing (CN)

(72) Inventors: Fei Liang, Beijing (CN); Jingjun Du, Beijing (CN); Lingyu Sun, Beijing (CN); Xiuyun Chen, Beijing (CN); Miao Liu, Beijing (CN); Zheng Wang, Beijing (CN); Xin Gai, Beijing (CN); Fei Dong, Beijing (CN); Liyu Fang, Beijing (CN); Tingxiu Hou, Beijing (CN); Daekeun Yoon, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 462 days.

(21) Appl. No.: 16/474,736

(22) PCT Filed: Nov. 21, 2018

(86) PCT No.: PCT/CN2018/116773
§ 371 (c)(1),
(2) Date: Jun. 28, 2019

(87) PCT Pub. No.: WO2019/157847
PCT Pub. Date: Aug. 22, 2019

(65) Prior Publication Data
US 2021/0349353 A1    Nov. 11, 2021

(30) Foreign Application Priority Data
Feb. 13, 2018    (CN) .......................... 201810150701.1

(51) Int. Cl.
*G02F 1/1335* (2006.01)
*G02F 1/1333* (2006.01)
*G02F 1/13357* (2006.01)

(52) U.S. Cl.
CPC .. *G02F 1/133616* (2021.01); *G02F 1/133308* (2013.01); *G02F 1/133605* (2013.01); *G02F 1/133608* (2013.01)

(58) Field of Classification Search
CPC ........... G02F 1/13332; G02F 1/133328; G02F 1/133308; G02F 1/133616; G02F 1/1336;
(Continued)

(56) References Cited

U.S. PATENT DOCUMENTS 6,992,718 B1 *   1/2006   Takahara .......... G02F 1/133553
                                                    348/333.09
2014/0153281 A1   6/2014   Zhao et al.
(Continued)

FOREIGN PATENT DOCUMENTS

CN            2593229        12/2003
CN          102436085         5/2012
(Continued)

OTHER PUBLICATIONS

1st Office Action dated Mar. 17, 2020 for Chinese Patent Application No. 201810150701.1.
(Continued)

*Primary Examiner* — Alan B Cariaso
(74) *Attorney, Agent, or Firm* — Thomas | Horstemeyer LLP

(57) ABSTRACT

A plastic frame component includes: a first frame strip, configured to match with a side edge of the display component to support the display device; a light source, disposed on the first frame strip and configured to emit light; and an optical path adjuster, disposed on the first frame strip. The first frame strip includes a first portion and a second portion that are connected to each other. The first portion and/or the second portion accommodate/accommodates the light source and the optical path adjuster, such that the first portion can protrude from the side edge of the display component and go beyond the display surface after the
(Continued)

plastic frame component is assembled with the total reflection display component, and that the light emitted by the light source shines onto a display area of the display component after being adjusted by the optical path adjuster.

15 Claims, 11 Drawing Sheets

(58) Field of Classification Search
CPC ......... G02F 1/133605; G02F 1/133606; G02F 1/133607; G02F 1/133608
See application file for complete search history.

(56) References Cited

U.S. PATENT DOCUMENTS

| | | | |
|---|---|---|---|
| 2016/0334566 A1 | 11/2016 | Qiao et al. | |
| 2018/0011353 A1* | 1/2018 | Wang | .......... G02B 6/0065 |
| 2018/0088412 A1* | 3/2018 | Kang | ............ G02F 1/133555 |
| 2018/0217445 A1 | 8/2018 | Zheng et al. | |

FOREIGN PATENT DOCUMENTS

| | | | | |
|---|---|---|---|---|
| CN | 102980105 | | 3/2013 | |
| CN | 104819409 | | 8/2015 | |
| CN | 104834048 | | 8/2015 | |
| CN | 204807877 | | 11/2015 | |
| CN | 205581476 | | 9/2016 | |
| CN | 108319054 | | 7/2018 | |
| EP | 3037874 A1 | * | 6/2016 | ............ G02B 6/002 |
| JP | 2006300850 | | 11/2006 | |
| KR | 100597805 | | 7/2006 | |
| TW | M526084 U | * | 7/2016 | ........... G02B 6/0096 |

OTHER PUBLICATIONS

International Search Report and Written Opinion dated Feb. 21, 2019 for PCT Patent Application No. PCT/CN2018/116773.

* cited by examiner

… (1)

TOTAL REFLECTION DISPLAY DEVICE AND PLASTIC FRAME COMPONENT

CROSS-REFERENCE TO RELATED APPLICATIONS

The present application is a § 371 national phase application based on PCT Patent Application No. PCT/CN2018/116773, filed on Nov. 21, 2018, which is based upon, claims the benefit of, and claims priority to Chinese Patent Application No. 201810150701.1, filed on Feb. 13, 2018, the contents thereof being incorporated by reference in their entirety herein.

TECHNICAL FIELD

The present disclosure generally relates to the field of display technologies, and more particularly, to a total reflection display device and a plastic frame component.

BACKGROUND

With the development of display technologies and rapidly increasing demand for outdoor wearables, outdoor display technologies have attracted more and more attention.

As a new type of display devices, total reflection display devices have attracted wide attention. When ambient light is bright enough, display may be implemented only using the ambient light, such that power consumption of the display devices during display may be reduced to a certain extent, which conforms to users' requirements for low power consumption and long standby time in display devices. However, when the ambient light is weaker (for example, at night), the total reflection display devices have the problem of producing a poor display effect.

In order to solve the above problem, the related art proposes a solution of adding a front optical system into the total reflection display device, wherein the front optical system includes a light-emitting diode (LED) and a front light guide plate (LGP) placed on a display side of the display panel, etc.

SUMMARY

Embodiments of the present disclosure provide a plastic frame component and a total reflection display device, which can improve problems in related technologies.

To achieve the above objective, the embodiments of the present disclosure adopt following technical solutions.

According to an aspect, there is provided a plastic frame component for matching up with a total reflection display component to form a total reflection display device. The total reflection display component has a display surface configured to render an image, wherein the plastic frame component includes:

a first frame strip, configured to match with a side edge of the display component to support the display component;

a light source, disposed on the first frame strip and configured to emit light; and an optical path adjuster, disposed on the first frame strip.

The first frame strip includes a first portion and a second portion that are connected to each other, wherein the first portion and/or the second portion accommodate/accommodates the light source and the optical path adjuster, such that the first portion can protrude from the side edge of the display component and go beyond the display surface after the plastic frame component is assembled with the total reflection display component, and such that the light emitted by the light source shines onto a display area of the display component after being adjusted by the optical path adjuster.

For example, the first portion and the display surface of the display component or the second portion enclose a gap whose opening faces toward a side of the display component, and the optical path adjuster and the light source are disposed in the gap.

For example, in the gap, a surface of the first portion that is opposite to the display surface and is away from the display component includes an inclined surface. An angle formed between the inclined surface and a plane where the display surface of the display component is ranges from 60° to 90°, and the light source is disposed on the inclined surface.

For example, the first portion and the second portion form an optical channel configured to transmit light, where a first end of the optical channel is positioned on a side wall of the first portion facing toward a side of the display component, and a second end of the optical channel is positioned in the second portion. The light source is positioned at the second end of the optical channel, and the optical path adjuster is positioned at the first end of the optical channel.

For example, the optical channel includes an optical cavity and a reflective layer covering a surface of the optical cavity. An opening of the optical cavity is positioned on a side wall of the first portion facing toward a side of the display component, and the optical cavity extends from the opening to a bottom end of the second portion.

For example, the first portion has an extension portion extending from a position at which the optical path adjuster is fixed to a first direction, and a surface of the extension portion opposite to the display surface is configured to reflect the light emitted from the light source.

The first direction is a direction in which a non-display area of the display component directs to the display area.

For example, the plastic frame component further includes at least one second frame strip. An upper end portion of the second frame strip goes beyond the display surface of the display component after the plastic frame component is assembled with the display component. An angle formed between a side wall in the upper end portion of the second frame strip adjacent to the display component and the display surface is an acute angle, and the side wall in the upper end portion of the second frame strip adjacent to the display component is configured to reflect the light emitted by the light source.

For example, the side wall in the upper end portion of the second frame strip adjacent to the display component is a recessed curved surface.

For example, the optical path adjuster is a lens strip, and at a light emission side of the lens strip, an angle formed between the lens strip and the display surface of the display component is an obtuse angle.

The lens strip is shaped like an arch rising in the first direction. Alternatively, the lens strip includes a first sub-lens strip and a second sub-lens strip positioned on a side of the first sub-lens strip away from the display component. The first sub-lens strip is shaped like an arch rising in a second direction, and the second sub-lens strip is shaped like an arch rising in the first direction.

The second direction is opposite to the first direction.

For example, at the light emission side of the lens strip, an angle formed between the lens strip and the display surface of the display component ranges from 90° to 120°.

For example, the optical path adjuster is a lens strip, and at a light emission side of the lens strip, an angle formed between the lens strip and the display surface of the display component is greater than or equal to 90°.

A light emission surface of the lens strip is divided into a first strip region, a second strip region, and a third strip region in a third direction. The light emission surface of the lens strip has a plurality of strip-shaped first microstructures in a portion of the first strip region. The light emission surface of the lens strip is a curved surface protruding in the first direction in a portion of the second strip region. The light emission surface of the lens strip has a plurality of strip-shaped second microstructures in a portion of the third strip region. The first microstructure is configured to deflect a portion of incident light rays in the third direction, and the second microstructure is configured to deflect a portion of the incident light rays in a fourth direction.

The first direction is a direction in which the non-display area of the display component directs to the display area. The third direction is a direction in which a back surface of the display component directs to the light emission surface. The fourth direction is opposite to the third direction.

For example, at the light emission side of the lens strip, an angle formed between the lens strip and the display surface of the display component ranges from 90° to 120°.

For example, the first microstructure includes a plane between which and a thickness direction of the lens strip there is provided with an included angle ranging from 0° to 60°, and the first microstructure further includes a curved surface that is in contact with the plane adjacent to the curved surface and bulges in the third direction. The second microstructure includes a plane between which and the thickness direction of the lens strip there is provided with an included angle ranging from 0° to 60°, and the second microstructure further includes a curved surface that is in contact with the plane adjacent to the curved surface and bulges in the fourth direction.

For example, a light incident surface of the lens strip is composed of a plurality of protruded hemispherical surfaces. Alternatively, the light incident surface of the lens strip is composed of a plurality of strip-shaped curved surfaces protruding toward the first direction or the second direction. The second direction is opposite to the first direction.

For example, the number of the first frame strip is one. Alternatively, the number of the first frame strips is two, and the two first frame strips are positioned on two opposite sides of the display component.

For example, if the display component is a rectangular display component, the first frame strip matches up with a shorter edge of the rectangular display component. Alternatively, the two first frame strips match up with two shorter edges of the rectangular display component.

According to another aspect, there is provided a total reflection display device, which includes:

a total reflection display component, having a display surface configured to render an image; and the aforementioned plastic frame component.

BRIEF DESCRIPTION OF THE DRAWINGS

To describe the technical solutions of the embodiments of the present disclosure or that of the prior art more clearly, the accompanying drawings required for describing the embodiments or the prior art will be briefly introduced below. Understandably, the accompanying drawings in the following description are merely some embodiments of the present disclosure. To those of ordinary skills in the art, other accompanying drawings may also be derived from these accompanying drawings without creative efforts.

FIG. 1(*b*) is a schematic top view II of a total reflection display device according to an embodiment of the present disclosure;

FIG. 1(*c*) is a schematic top view III of a total reflection display device according to an embodiment of the present disclosure;

FIG. 1(*d*) is a schematic top view IV of a total reflection display device according to an embodiment of the present disclosure;

FIG. 12(*b*) is a simulated diagram when the structure as shown in FIG. 12(*a*) is used as a total reflection device;

FIG. 13(*b*) is a simulated diagram when the structure as shown in FIG. 13(*a*) is used as a total reflection device;

FIG. 14(*b*) is a simulated diagram when the structure as shown in FIG. 14(*a*) is used as a total reflection device.

Figure 1A:
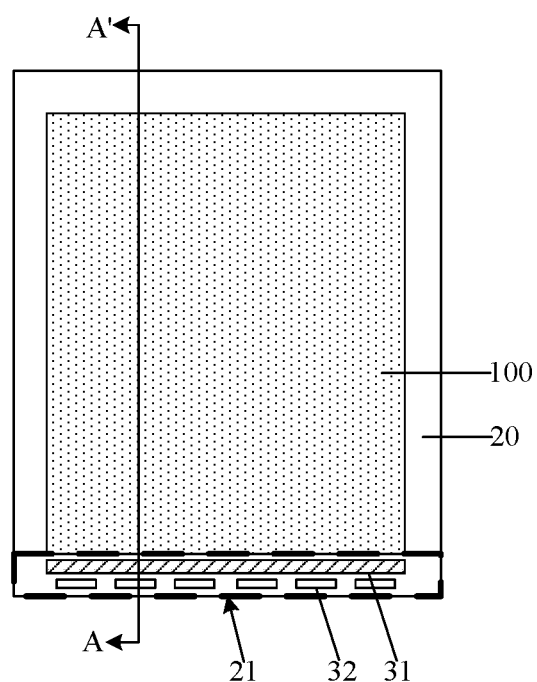
FIG. 1(*a*) is a schematic top view I of a total reflection display device according to an embodiment of the present disclosure.

The reference numerals in the attached drawings are as follows:

DETAILED DESCRIPTION

Technical solutions in the embodiments of the present disclosure will be described clearly and completely below, in conjunction with the accompanying drawings in the embodiments of the present disclosure. Understandably, the described embodiments are some but not all of the embodiments of the present disclosure. All other embodiments obtained by persons of ordinary skill in the art based on the embodiments of the present disclosure without creative efforts shall fall within the protection scope of the present disclosure.

In a front optical system in the related art, light is emitted through a light-emitting diode (LED) to reach a front light guide plate (LGP), then enters a panel, and finally is emitted after being reflected by a reflection layer. As the LED has a shorter mixed light distance, a great deal of light enters the panel at larger angle, uniformity of the overall display effect is low, and the phenomenon of hotspot is serious.

For the problems in the related art, an embodiment of the present disclosure provides a plastic frame component for supporting a display panel, and a light source and an optical path adjuster are arranged on the plastic frame component, such that after the plastic frame component is assembled with the total reflection panel, light emitted by the light source shines onto the display panel after being adjusted by the optical path adjuster. In this way, uniformity of the light can be improved even though ambient light is weaker.

The plastic frame component in the present disclosure is used in conjunction with the total reflection panel, and thus, the specific structure of the plastic frame component is described with reference to a total reflection display device in the following embodiments.

The total reflection display device provided by the embodiments of the present disclosure is as shown in FIG. 1(a), FIG. 1(b), FIG. 1(c), FIG. 1(d), FIG. 2, FIG. 3, and FIG. 8. The total reflection display device includes a display component 100 and a frame 20 positioned on a side face of the display component 100. Each frame strip of the frame 20 is positioned on a side of the display component 100. The frame 20 includes at least one first frame strip 21. The first frame strip 21 is fixedly provided with a light source 32 and an optical path adjuster 31. The optical path adjuster 31 goes beyond the display surface of the display component 100, and light emitted by the light source 32 shines onto a display area of the display component 100 after being adjusted by the optical path adjuster 31.

Here, the light emitted by the light source 32 shines onto the display area of the display component 100 after being adjusted by the optical path adjuster 31. Next, after being reflected by a reflective layer in the display component 100, the light is emitted from the display component 100. In this way, display may be implemented.

The display component 100 includes a display panel, which includes an array substrate and an opposing substrate. The display panel may be a liquid crystal display panel. In addition, the total reflection display device further includes a circuit for enabling the display component 100 to display, etc., and a back plate 40 for further fixing the display component 100. The circuit is integrated onto a circuit board 41, the circuit board 41 is fixed onto the back plate 40 by an adhesive layer, and the display component 100 is fixed into the frame 20 formed by a plurality of frame strips by an adhesive layer.

Figure 2:
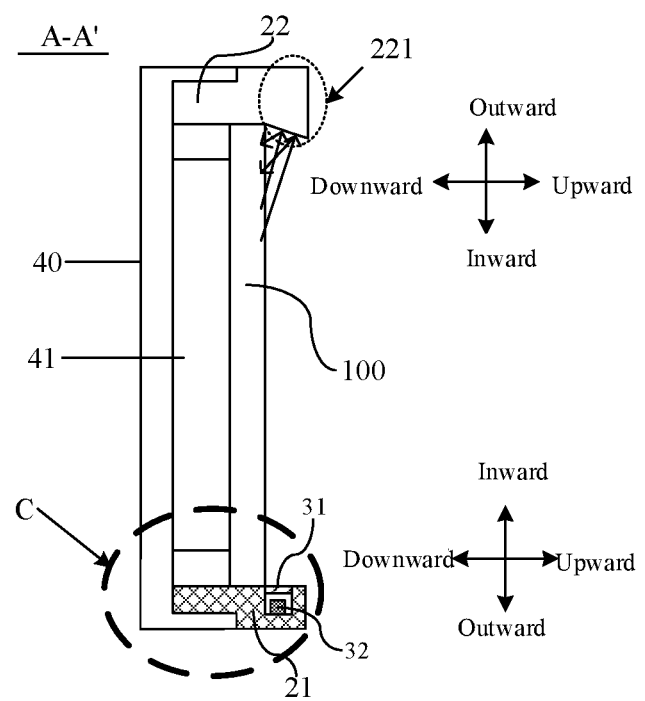
FIG. 2 is a schematic sectional view I along an A-A' direction in FIG. 1.
Figure 3:
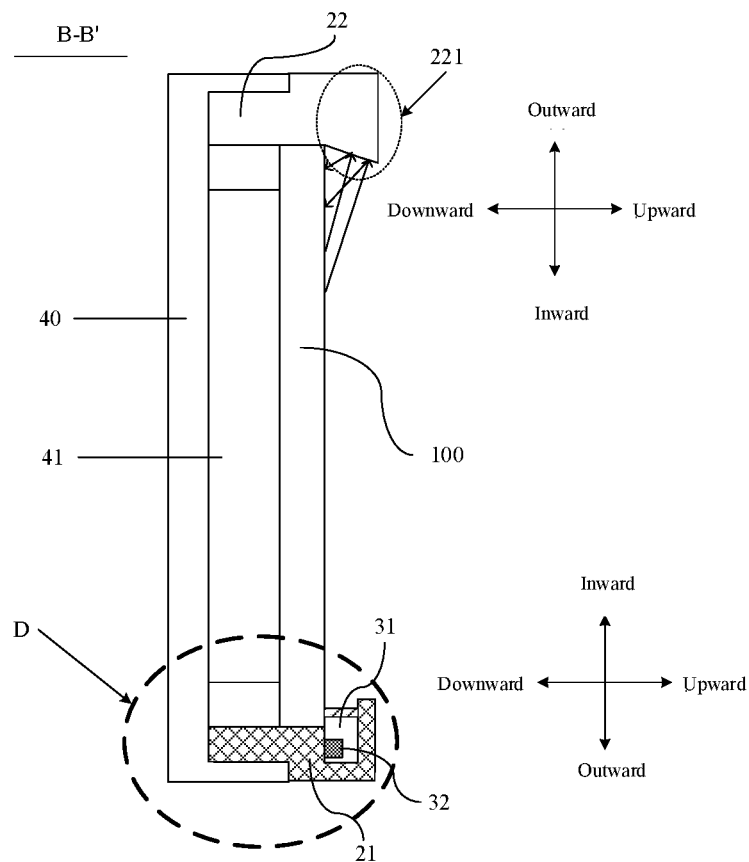
FIG. 3 is a schematic sectional view along a B-B' direction in FIG. 1(*b*)
Figure 4:
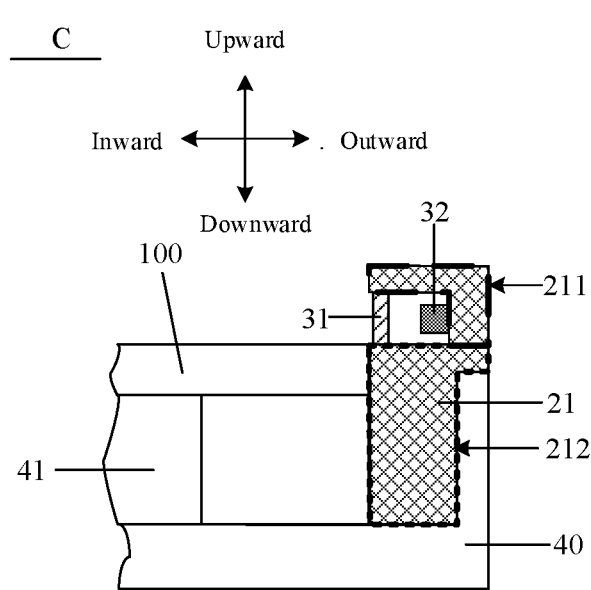
FIG. 4 is an enlarged view I of Region C in FIG. 2.

It is to be noted that, first, as shown in FIG. 2, FIG. 3, and FIG. 4, the display surface of the display component 100, i.e., the upper surface of the display component 100, refers to the surface on the display side of the display component 100.

Second, the light emitted by the light source 32 may shine onto the entire display area of the display component 100 after being adjusted by the optical path adjuster 31, or may shine onto a part of the display area, as long as the light reflected by the reflective layer in the display component 100 may be emitted from an area of the display component 100 for displaying. The area for displaying may be the entire display area or may be a part of the display area.

The optical path adjuster 31 may be a lens strip, which may diverge light, such that the light emitted by the light source 32 shines onto the lens strip, and then shines onto the display area of the display component 100 after being diverged by the lens strip.

As an example, when the entire display area of the display component 100 is configured to display, the light emitted from the light source 32 shines onto the entire display area of the display component 100 after being adjusted by the optical path adjuster 31, then the light is reflected by the reflective layer in the display component 100, and then is emitted from the entire display area of the display component 100. Alternatively, the light emitted from the light source 32 shines onto a part of the display area of the display component 100 after being adjusted by the optical path adjuster 31, then, the light is reflected by the reflective layer in the display component 100, and is thereafter emitted from the entire display area of the display component 100.

Third, the frame 20 may be a plastic frame, which is made from a material the same as the back plate 40, for example, polycarbonate (PC), acrylonitrile-butadiene-styrene (ABS), or the like. The frame 20 also may be a structure for fixing the light source 32 and the optical path adjuster 31 other than the plastic frame.

Figure 1B:
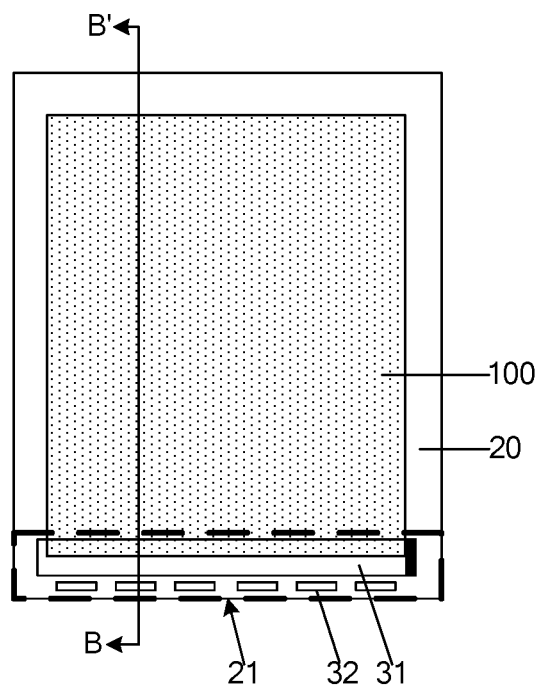
Figure 1C:
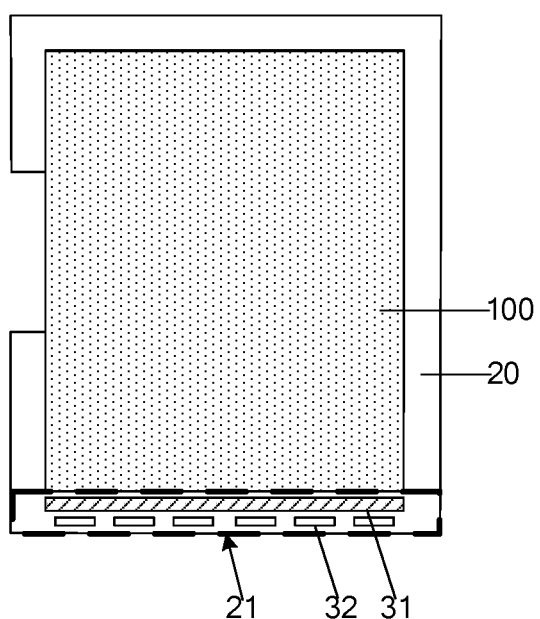
Figure 1D:
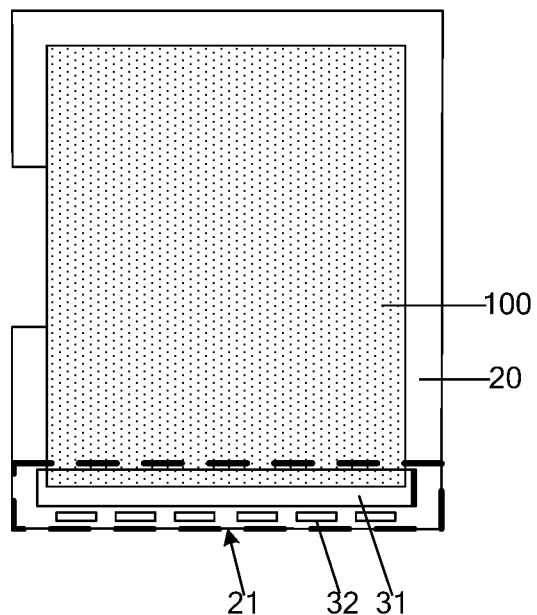

Exemplarily, when the frame 20 is the plastic frame, as shown in FIG. 1(a) and FIG. 1(b), the frame 20 may include four complete frame strips. As shown in FIG. 1(c) and FIG. 1(d), the frame 20 may also include three complete frame strips and one partially broken frame strip. A flexible printed circuit (FPC) in the display component 100 is bent in the broken portion of the frame strip. The flexible printed circuit is configured to connect the circuit board 41 and the display component 100 described above, wherein the circuit board 41 may be either a flexible printed circuit or a printed circuit board (PCB).

As an example, when the frame 20 is the structure for fixing the light source 32 and the optical path adjuster 31 other than the plastic frame, the plastic frame includes two frame strips positioned on two opposite sides of the display component 100, and the frame 20 includes two frame strips 21 positioned on two other sides of the display component 100, or one frame strip 21 positioned on either side of the two other sides of the display component 100.

Fourth, the light source 32 may include a plurality of cold cathode fluorescent lamps (CCFLs), or may include a plurality of LEDs.

Fifth, the frame 20 may include one, two, three, and four first frame strips 21. When the frame 20 includes one or two first frame strips 21, in order to make the size of the light source 32 and the size of the optical path adjuster 31 small enough to reduce costs, the first frame strip 21 is positioned on a short side of the display component 100. On this basis, when the frame 20 includes two first frame strips 21, for example, the two first frame strips 21 are respectively positioned on two short sides of the display component 100 to further enhance the uniformity of the overall display effect.

For the plastic frame component provided by the embodiments of the present disclosure, light is emitted from the LED and is then projected onto a total reflection panel via the optical path adjuster. A reflective structure on a non-light source side of the plastic frame component may repeatedly use light emitted from the panel and ambient light to enhance the overall brightness and light uniformity of the total reflection display device, so as to achieve the effect of reducing power consumption of the total reflection device and improve the display effect.

In addition, in the total reflection display device provided by the embodiments of the present disclosure, an optical path adjuster 31 and a light source 32 are arranged on the first frame strip 21, and the optical path adjuster 31 goes beyond the display surface of the display component 100, such that light emitted by the light source 32 may shine onto the display area of the display component 100 after being adjusted by the optical path adjuster 31. Next, the light is reflected by the reflective layer in the display component 100, and then the light reflected by the reflective layer is emitted from the display component 100. In this way, the display uniformity is enhanced, and the display effect is improved.

In addition, on the basis of normal display, each of the frame strips 21 of the present disclosure is arranged on one side of the display component 100, not like the front light guide plate in the related art where an entire layer of frame strips is arranged on the display surface of the display component 100. Therefore, the present disclosure facilitates the thin design of the total reflection display device as compared with the related art.

For example, the light source 32 and the optical path adjuster 31 are arranged along an extension direction of the first frame strip 21.

It is to be noted that the light source 32 may be either a light bar or a plurality of separate light-emitting units arranged in at least one row.

In the embodiment of the present disclosure, the light source 32 and the optical path adjuster 31 are arranged along the extension direction of the first frame strip 21, such that the light emitted from the optical path adjuster 31 may more uniformly shine onto the display area of the display component 100 to display.

For example, as shown in FIG. 2, FIG. 3, FIG. 4 and FIG. 5, the first frame strip 21 is composed of a first portion 211 and a second portion 212 connected to one another, wherein the first portion 211 extends beyond the display surface of the display component 100. The first portion 211 and the display surface of the display component 100 or the second portion 212 enclose a gap whose opening faces toward a side of the display component 100, and the optical path adjuster 31 and the light source 32 are disposed in the gap.

It is to be noted that, first, the first portion 211 and the second portion 212 of the first frame strip 21 are generally of an integrative structure.

Second, the light emitted by the light source 32 shines onto the display area of the display component after being adjusted by the optical path adjuster 31. Therefore, as shown in FIG. 2, FIG. 3, FIG. 4 and FIG. 5, the light source 32 is located on an outer side the optical path adjuster 31, wherein the "outer side" is a relative concept. For example, the non-display area of the display component 100 is located on the outer side of the display area of the display component 100.

As shown in FIG. 2, FIG. 3, FIG. 4 and FIG. 5, "the first portion 211 and the display surface of the display component 100 or the second portion 212 enclose a gap whose opening faces toward a side of the display component 100" also may be understood as "the first portion 211 and the display surface of the display component 100 or the second portion 212 enclose a gap whose opening faces inwardly", wherein "opening facing inwardly" refers to an opening on the surface of an inner side of the frame strip. Herein, the "inner side" also is a relative concept. For example, the display area of the display component 100 is located in the inner side the non-display area of the display component 100.

Similarly, the "upper" and "lower" in the following texts are also relative concepts. For example, the opposing substrate of the display component 100 is located on an upper side of the array substrate of the display component 100. The array substrate of the display component 100 is located on a lower side of the opposing substrate of the display component 100.

Figure 5:
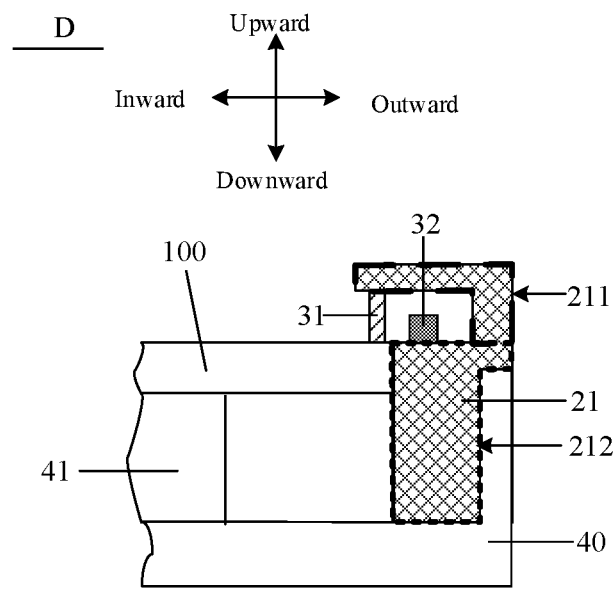
FIG. 5 is an enlarged view I of Region D in FIG. 3.

Third, as shown in FIG. 2 and FIG. 4, the light source 32 may be fixed to the first portion 211 of the first frame strip 21. As shown in FIG. 3 and FIG. 5, the light source 32 may be fixed to the second portion 212 of the first frame strip 21, which is not limited in the present disclosure, as long as the light source 32 is disposed in the gap, and the light emitted by the light source 32 may shine onto the display area of the display component 100 after being adjusted by the optical path adjuster 31.

Fourth, as shown in FIG. 3 and FIG. 5, the optical path adjuster 31 is located in the gap whose opening faces toward a side of the display component 100 that is enclosed by the first portion 211 and the display surface of the display component 100. That is, an orthographic projection of the first portion 211 on the display component 100 has an overlapping portion with respect to the display component 100. Here, in order to prevent the first frame strip 21 from shielding a display screen, for example, the overlapping portion is located in the non-display area of the display component 100.

In the embodiments of the present disclosure, the first portion 211 may be formed only by opening the surface of the inner side of the first frame strip 21, then, the first portion 211 and the upper surface of the display component 100 or the second portion 212 enclose the gap whose opening faces toward a side of the display component 100, and the optical path adjuster 31 and the light source 32 are disposed in the gap, which is simple in structure and is easily formed, and it is easy to stably install the optical path adjuster 31.

Figure 6:
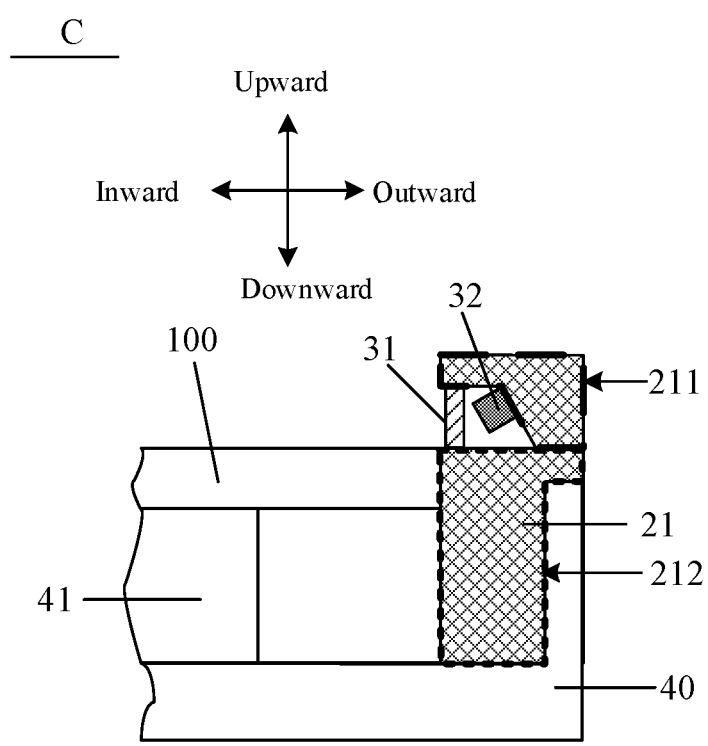
FIG. 6 is an enlarged view II of Region C in FIG. 2.
Figure 7:
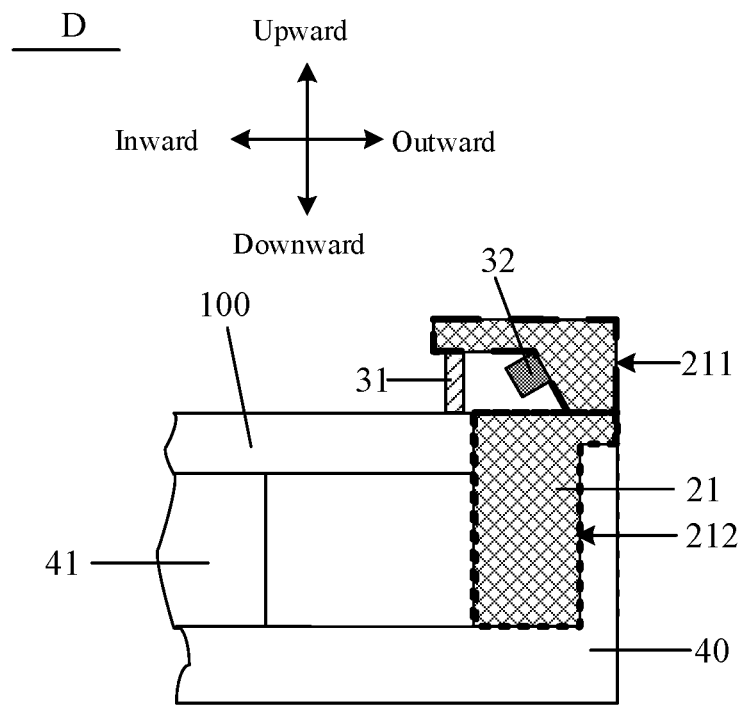
FIG. 7 is an enlarged view II of Region D in FIG. 3.

Further, as shown in FIG. 6 and FIG. 7, a surface of the gap that is opposite to the display surface and is away from the display component 100 includes an inclined surface. An angle formed between the inclined surface and a plane where the display surface of the display component 100 is ranges from 60° to 90°, and the light source 32 is disposed on the inclined surface.

Here, generally a back surface of the light source 32 is disposed on the inclined surface.

In the embodiments of the present disclosure, light emitted from the commonly-used light source 32 such as an LED has directivity and a certain illumination range, wherein a common illumination range is from −30° to 30°, such that an included angle is formed between the inclined surface and the upper surface of the display component 100, wherein the included angle ranges from 60° to 90°, and the light source 32 is disposed on the inclined surface. In this way, the light emitted by the light source 32 may be tilted downward by 0°-30°, such that the light shines as much as possible onto the display area of the display component 100 after being adjusted by the optical path adjuster 31, which is advantageous in improving the light utilization efficiency and increasing the display brightness of the display component 100.

Further, as shown in FIG. 6 and FIG. 7, the light source 32 is located at the upper end of the inclined surface.

In the embodiments of the present disclosure, a part of the light emitted by the light source 32 shines onto the lower surface of the gap and is absorbed. Therefore, compared with arranging the light source 32 at the lower end and a middle location of the inclined surface, arranging the light source 32 at the upper end of the inclined surface may allow the light emitted from the light source 32 to shine onto the display area of the display component 100 through the optical path adjuster 31 to the greatest extent, which is advantageous in improving the light utilization efficiency and increasing the display brightness of the display component 100 to the greatest extent.

Figure 8:
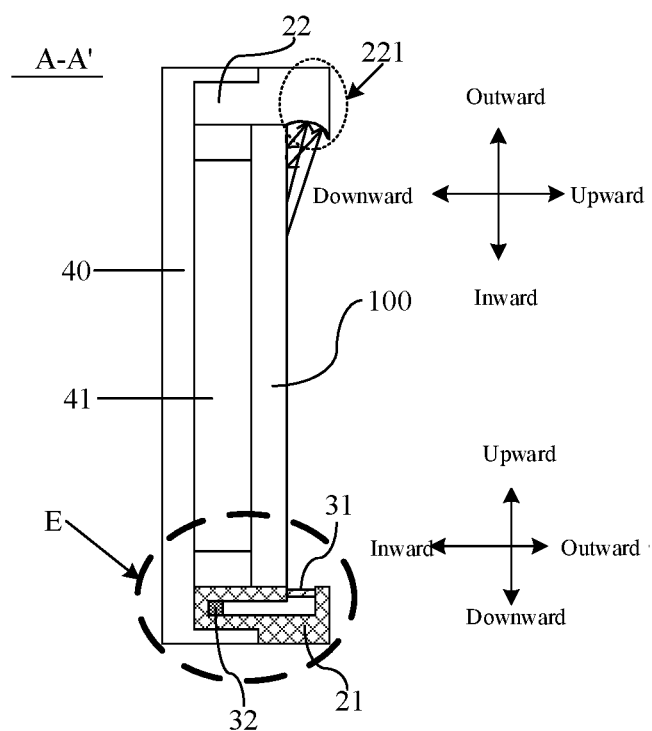
FIG. 8 is a schematic sectional view II along an A-A' direction in FIG. 1(*a*)
Figure 9:
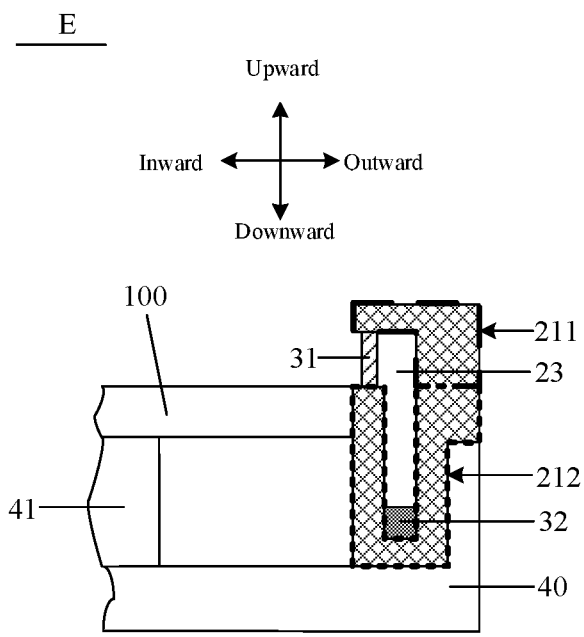
FIG. 9 is an enlarged view of Region E in FIG. 8.

For example, as shown in FIG. 8 and FIG. 9, the first frame strip 21 is composed of a first portion 211 and a second portion 212 connected to one another, wherein the first portion 211 extends beyond the display surface of the display component 100. The first frame strip 21 is internally provided with an optical channel 23 configured to transmit light, wherein a first end of the optical channel 23 is located on a side wall of the first portion 211 facing towards a side of the display component 100, and a second end of the optical channel 23 is located in the second portion 212 of the first frame strip 21. The light source 32 is located at the second end of the optical channel 23, and the optical path adjuster 31 is located at the first end of the optical channel 23.

It is to be noted that, first, the first portion 211 and the second portion 212 of the first frame strip 21 are generally of an integrative structure.

Second, the specific structure of the optical channel 23 is not limited as long as light emitted from the light source 32 at the second end of the optical channel 23 may be reflected back and forth in the optical channel 23, and finally, the light may shine onto the display area of the display component 100 after being adjusted by the optical path adjuster 31 at the first end. For example, the optical channel 23 may be an optical fiber for transmitting light, or may be composed of an optical cavity and a reflective layer covering the surface of the optical cavity.

Here, the optical channel 23 for example includes: an optical cavity and a reflective layer covering the surface of the optical cavity. The opening of the optical cavity is located on a side wall of the first portion 211 facing toward a side of the display component 100, and the optical cavity extends from the opening to a bottom end of the second portion 212 of the first frame strip 21. The optical path adjuster 31 is located at the opening of the optical cavity, and the light source 32 is located at the bottom end of the second portion 212. The bottom end of the second portion 212 refers to the lowermost end of the second portion 212.

Third, the optical path adjuster 31 is positioned at the first end of the optical channel 23, and the first frame strip 21 may fix the optical path adjuster 31. Therefore, as shown in FIG. 9, the first portion 211 includes a portion for enclosing the first end of the optical channel 23, and further includes a portion for fixing the optical path adjuster 31.

In the embodiments of the present disclosure, the light emitted from the light source 32 may be approximately regarded as a plurality of point light sources. Therefore, the light emitted from the light source 32 cannot uniformly shine on the optical path adjuster 31. Therefore, the first frame strip 21 is internally provided with an optical channel 23 configured to transmit light, such that light emitted from the light source 32 may be reflected back and forth in the optical channel 23, and finally, the light may shine onto the optical path adjuster 31 at the first end in the form of a surface light source, and shine onto the display area of the display component 100 after being adjusted by the optical path adjuster 31. Thus, the uniformity of the overall display effect may be improved.

Figure 10:
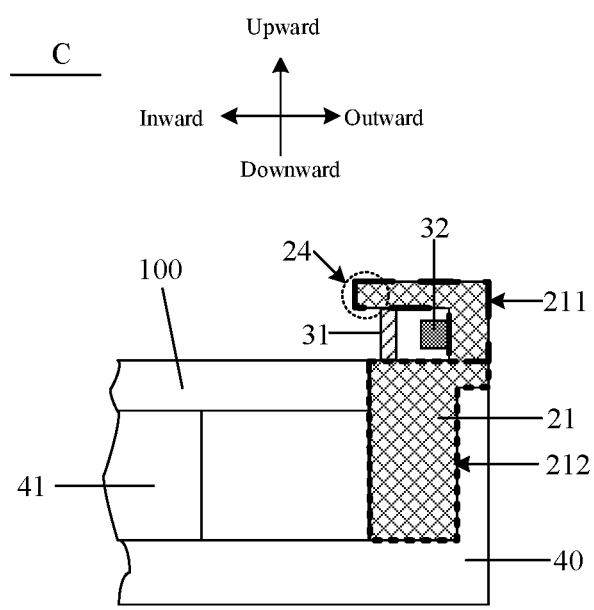
FIG. 10 is an enlarged view III of Region C in FIG. 2.

For example, as shown in FIG. 10, the first portion 211 has an extension portion 24 extending from a position at which the optical path adjuster 31 is fixed to a first direction, and a surface of the extension portion 24 which is opposite to the display surface and is close to the display component 100 may reflect the light. The first direction is a direction in which a non-display area of the display component 100 directs to the display area, i.e., a direction from outside to inside in FIG. 10 (in FIG. 10, only taking for fact that both the optical path adjuster and the light source are disposed in the gap enclosed by the first portion and the second portion, as an example).

It is to be noted that, first, the first portion 211 may include a reflective material, or, a reflective layer may be disposed on the surface of the extension portion 24 which is opposite to the display surface and is close to the display component 100, such that the surface of the extension portion 24, which is opposite to the display surface and is close to the display component 100, may reflect the light.

Second, the first direction is the inward direction as indicated in FIG. 10.

In the embodiments of the present disclosure, after being adjusted by the optical path adjuster 31, the light is emitted from the optical path adjuster 31. The light emitted from the optical path adjuster 31 includes emergent light upward with respect to the direction of incident light, and a part of this portion of light cannot shine on the display area of the display component 100 for utilization. Therefore, the surface of the extension portion 24 which is opposite to the display surface and is close to the display component 100 can reflect light, such that the emergent light emitted from the optical path adjuster 31 which is upward with respect to the direction of the incident light may be reflected. In this way, the light utilization efficiency is increased.

For example, as shown in FIG. 2, FIG. 3 and FIG. 8, the frame 20 further includes at least one second frame strip 22. An upper end portion 221 of the second frame strip 22 goes beyond the display surface of the display component 100, an angle formed between a side wall in the upper end portion 221 of the second frame strip 22 adjacent to the display component 100 and the display surface is an acute angle, and the side wall in the upper end portion 221 of the second frame strip 22 adjacent to the display component 100 may reflect the light.

It is to be noted that, first, taking the frame 20 including four frame strips as an example, if one frame strip of the frame 20 is the first frame strip 21, the number of the second frames 22 may be one, two, or three. If two frame strips of the frame 20 are the first frame strips 21, the number of the second frame strips 22 may be one or two. If three frame strips of the frame 20 are the first frame strips 21, the number of the second frame strip 22 may be one.

Second, the shape of the side wall in the upper end portion 221 of the second frame strip 22 adjacent to the display component 100 is not limited as long as the angle between the side wall and the display surface is an acute angle. For example, as shown in FIG. 2 and FIG. 3, the side wall in the upper end portion 221 of the second frame strip 22 adjacent to the display component 100 is an inclined plane. Alternatively, as shown in FIG. 8, the side wall in the upper end portion 221 of the second frame strip 22 adjacent to the display component 100 is a concave curved surface.

Third, the upper end portion 221 of the second frame strip 22 may include a reflective material, or a reflective layer may be disposed on the side wall in the upper end portion 221 of the second frame strip 22 adjacent to the display component 100, such that the side wall in the upper end portion 221 of the second frame strip 22 adjacent to the display component 100 may reflect the light.

In the embodiments of the present disclosure, neither the optical path adjuster 31 nor the side wall in the upper end portion 221 of the second frame strip 22 of the light source 32 adjacent to the display component 100 is arranged, and the light reflected from the reflective layer in the display component 100 and the ambient light may be reflected, such that a portion of the reflected light may shine again onto the display area of the display component 100 for utilization, and thus the power consumption may be reduced. Taking a 2.27-inch total reflection display device as an example, the power consumption may be reduced by 35%.

Figure 11:
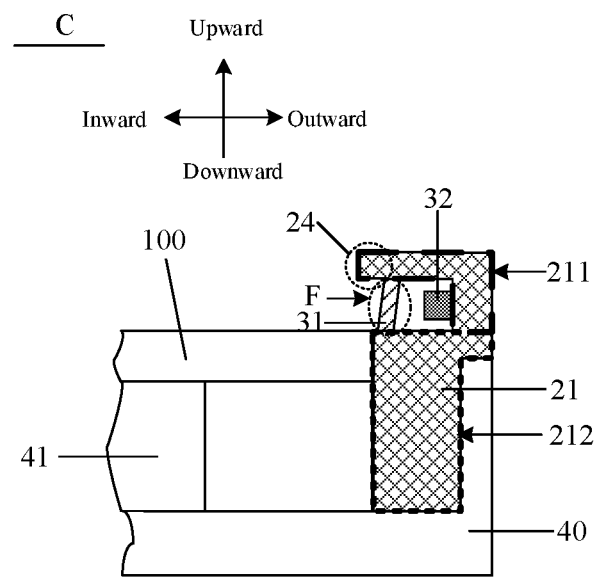
FIG. 11 is an enlarged view IV of Region C in FIG. 2.
Figure 12A:
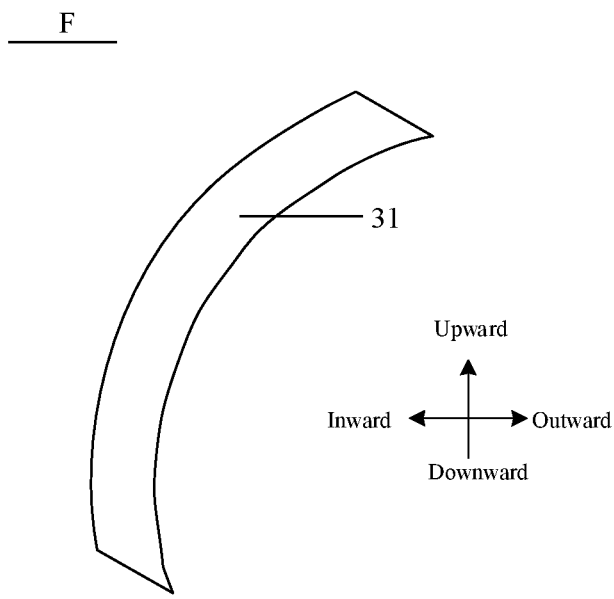
FIG. 12(*a*) is an enlarged view I of Region F in FIG. 11.
Figure 12B:
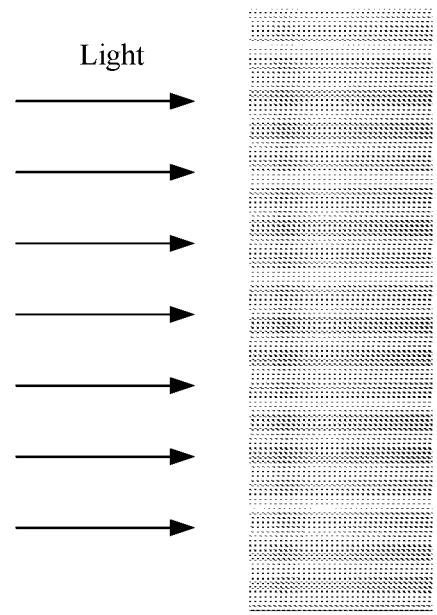
Figure 13A:
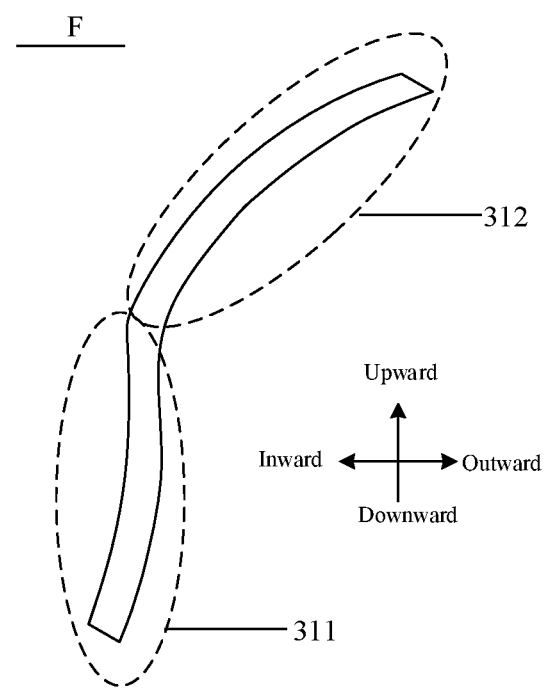
FIG. 13(*a*) is an enlarged view II of Region F in FIG. 11.

For example, as shown in FIG. 11, FIG. 12(*a*), and FIG. 13(*a*), the optical path adjuster 31 is a lens strip, and at a light emission side of the lens strip, an angle formed between the lens strip and the display surface of the display component 100 is an obtuse angle. As shown in FIG. 12(*a*), the lens strip is shaped like an arch rising in the first direction. Alternatively, as shown in FIG. 13(a), the lens strip includes a first sub-lens strip 311 and a second sub-lens strip 312 positioned on a side of the first sub-lens strip 311 away from the display component 100. The first sub-lens strip 311 is shaped like an arch rising in a second direction, and the second sub-lens strip 312 is shaped like an arch rising in the first direction. The first direction is a direction in which the non-display area of the display component 100 directs to the display area. The second direction is opposite to the first direction (in FIG. 11, an example is taken where the lens strip is arranged in the gap enclosed by the first portion and the second portion).

It is to be noted that, first, at a light emission side of the lens strip, the angle formed between the lens strip and the display surface of the display component 100 is an obtuse angle. However, the lens strip does not necessarily come into contact with the display surface of the display component 100. As shown in FIG. 4 and FIG. 9, the lens strip is only in contact with the first portion 211 and the second portion 212 of the first frame strip 21. As shown in FIG. 5, one end of the lens strip is in contact with the first portion 211, and the other end of the lens strip is in direct contact with the display surface of the display component 100. Of course, for the structure in FIG. 5, the first portion 211 of the first frame strip 21 may further include an extension portion in direct contact with the display surface of the display component 100, and the lens strip is disposed between the extension portion and the first portion 211, such that the lens strip is also not in direct contact with the display surface of display component 100.

The expression "the angle formed between the lens strip and the display surface of the display component 100 is an obtuse angle" may be considered that the angle formed between a surface parallel to the display surface of the display component 100 and the lens strip is an obtuse angle.

Second, at the light emission side of the lens strip, the angle formed between the lens strip and the display surface of the display component 100 is an obtuse angle, which refers to a fact that, at the light emission side of the lens strip, the angle formed between the display surface of the display component 100 and a connection line between an uppermost end portion and a lowermost end portion of the lens strip is an obtuse angle.

Third, the first direction is the inward direction as indicated in FIG. 12(a) and FIG. 13(a), and the second direction is the outward direction as indicated in FIG. 12(a) and FIG. 13(a).

In the embodiments of the present disclosure, in the display area of the display component 100, the portion the closer to the first frame strip 21 receives the light of the higher intensity emitted from the lens strip.

On this basis, in the case that the surface of the extension portion 24, which is opposite to the display surface and is close to the display component 100, may reflect the light, simulation results for the lens strip (as shown in FIG. 12(a)) shaped like an arch rising inwardly are shown in FIG. 12(b). The light emitted from the portion positioned at a lower side of the arch-shaped structure may shine as much as possible onto the surface of the extension portion 24, which is opposite to the display surface and is close to the display component 100. After being reflected by the surface of the extension portion 24, which is opposite to the display surface and is close to the display component 100, the light may shine, as much as possible onto a portion of the display area of the display component 100 farther away from the first frame strip 21. In this way, the uniformity of the overall display effect of the display component 100 may be improved on the basis of improving the light utilization efficiency. As shown in FIG. 12(b), in the display area of the display component 100, there exists a dark area only at a location close to the light source 32.

Figure 13B:
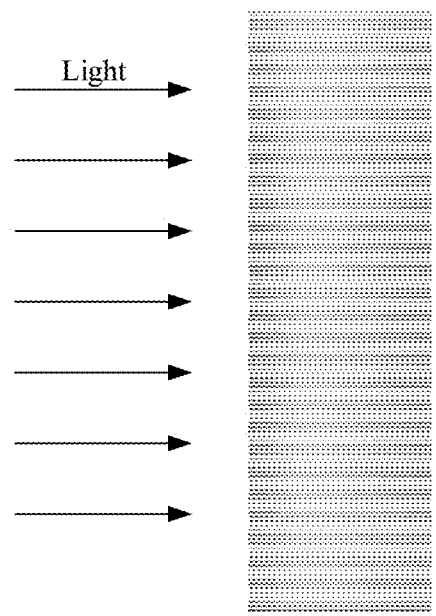

In the case that the surface of the extension portion 24, which is opposite to the display surface and is close to the display component 100, may reflect the light, simulation results for the lens strip (as shown in FIG. 13(a)) includes the first sub-lens strip 311 and the second sub-lens strip 312 are shown in FIG. 13(b). The light emitted from the first sub-lens strip 311 may shine as much as possible onto the location close to the light source 32 in the display area of the display component 100 and a portion in the middle. The light emitted from the second sub-lens strip 312 may shine onto the surface of the extension portion 24 which is opposite to the display surface and is close to the display component 100. After being reflected by the surface of the extension portion 24, which is opposite to the display surface and is close to the display component 100, the light may shine as much as possible onto a portion of the display area of the display component 100 farther away from the first frame strip 21. In this way, the uniformity of the overall display effect of the display component 100 may be improved on the basis of improving the light utilization efficiency. With respect to the arch-shaped lens strip as shown in FIG. 12 (a), as shown in FIG. 13 (b), the dark area may be moved toward the location close to the light source 32.

For example, at the light emission side of the lens strip, an angle formed between the lens strip and the display surface of the display component 100 ranges from 90° to 120°.

Here, the expression "at the light emission side of the lens strip, an angle formed between the lens strip and the display surface of the display component 100 ranges from 90° to 120°" refers to a fact that at the light emission side of the lens strip, the angle formed between the display surface of the display component 100 and the connection line between an uppermost end portion and a lowermost end portion of the lens strip ranges from 90° to 120°.

In the embodiments of the present disclosure, at the light emission side of the lens strip, the angle formed between the lens strip and the display surface of the display component 100 ranges from 90° to 120°, which may further improve the uniformity of the overall display effect.

Figure 14A:
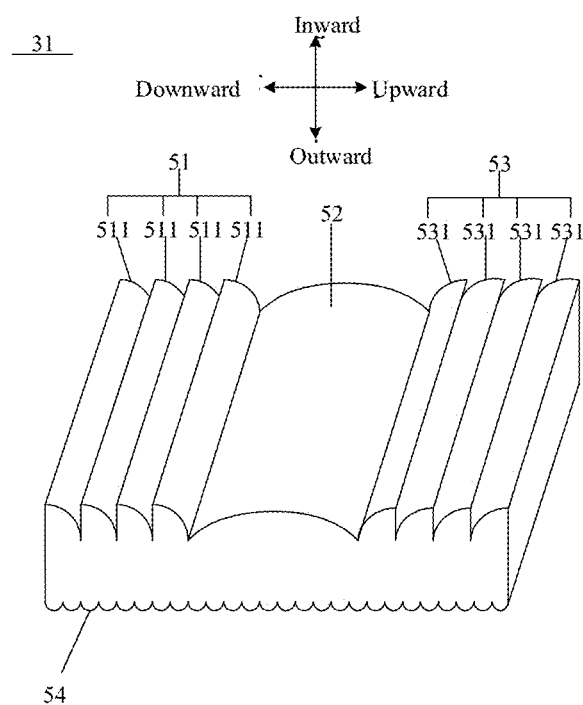
FIG. 14(*a*) is a schematic structural diagram of a lens strip according to an embodiment of the present disclosure.

For example, as shown in FIG. 14(a), the optical path adjuster 31 is a lens strip, and at the light emission side of the lens strip, the angle formed between the lens strip and the display surface of the display component 100 is greater than or equal to 90°. A light emission surface of the lens strip is divided into a first strip region 51, a second strip region 52 and a third strip region 53 in a third direction. The light emission surface of the lens strip has a plurality of strip-shaped first microstructures 511 in a portion of the first strip region 51. The light emission surface of the lens strip is a curved surface protruding in the first direction in a portion of the second strip region 52. The light emission surface of the lens strip has a plurality of strip-shaped second microstructures 531 in a portion of the third strip region 53. The first microstructure 511 is configured to deflect a portion of incident light rays in the third direction, and the second microstructure 531 is configured to deflect a portion of the incident light rays in a fourth direction.

It is to be noted that, first, at the light emission side of the lens strip, the angle formed between the lens strip and the display surface of the display component 100 is greater than or equal to 90°. However, the lens strip does not necessarily come into contact with the display surface of the display component 100. As shown in FIG. 4 and FIG. 9, the lens strip is only in contact with the first portion 211 and the second portion 212 of the first frame strip 21. As shown in FIG. 5, one end of the lens strip is in contact with the first portion 211, and the other end of the lens strip is in direct contact with the display surface of the display component 100. Of course, for the structure in FIG. 5, the first portion 211 of the first frame strip 21 may further include an extension portion in direct contact with the display surface of the display component 100, and the lens strip is disposed between the extension portion and the first portion 211 such that the lens strip is also not in direct contact with the upper surface of display component 100.

The expression "the angle formed between the lens strip and the display surface of the display component 100 is greater than or equal to 90°" may be considered that the angle formed between a surface parallel to the display surface of the display component 100 and the lens strip is greater than or equal to 90°.

Second, at the light emission side of the lens strip, the angle formed between the lens strip and the upper surface of the display component 100 is greater than or equal to 90°, which refers to a fact that at the light emission side of the lens strip, the angle formed between the display surface of the display component 100 and a connection line between an uppermost end portion and a lowermost end portion of the lens strip is greater than or equal to 90°.

Figure 14B:
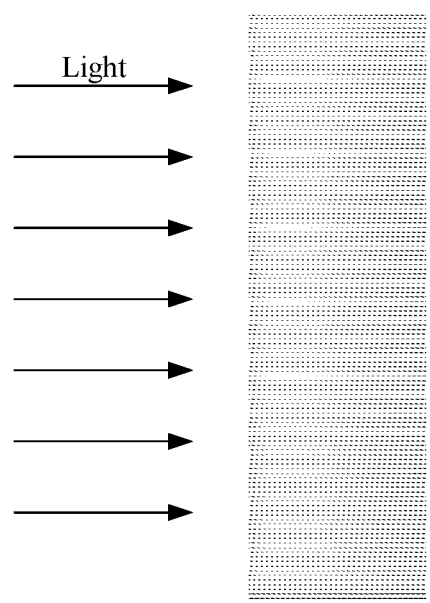

Third, the first direction is the inward direction as indicated in FIG. 14(*a*), the third direction is the upward direction as indicated in FIG. 14(*a*), and the fourth direction is the inward direction as indicated in FIG. 14(*a*).

Fourth, the "deflecting in the third direction" in "the first microstructure 511 is configured to deflect a portion of incident light rays in the third direction" means that the emergent direction of the light incident onto the first microstructure 511 deflects toward the third direction more than the incident direction of the light incident onto the first microstructure 511. The "deflecting in the fourth direction" in "the second microstructure 531 is configured to deflect a portion of incident light rays in the fourth direction" means that the emergent direction of the light incident onto the first microstructure 511 deflects toward the fourth direction more than the incident direction of the light incident onto the first microstructure 511.

In the embodiments of the present disclosure, in the display area of the display component 100, the portion the closer to the first frame strip 21 receives the light of the higher intensity emitted from the lens strip.

On this basis, a part of light incident from the first microstructure 511 is deflected toward the third direction, which may reduce the intensity of the light received by the portion of the display area closer to the light source 32. Another part of light is still incident from the first microstructure 511 to the portion of the display area closer to the light source 32. On this basis, in the case that the surface of the extension portion 24, which is opposite to the display surface and is close to the display component 100, may reflect light, the light deflecting toward the third direction may also be reflected on the surface of the extension portion 24 which is opposite to the display surface and is close to the display component 100, and may shine onto the middle portion of the display area of the display component 100 and a portion farther away from the first frame strip 21. The second strip region 52 may function to achieve a smooth transition of the brightness of the middle portion of the display area. A part of the light incident from the second microstructure 531 is deflected toward the fourth direction such that this part of the light may shine as much as possible onto the middle portion of the display area of the display component 100 and the portion farther away from the first frame strip 21. Therefore, on the basis of improving the light utilization efficiency, the uniformity of the overall display effect of the display component 100 may be improved such that, as shown in FIG. 14(*b*), no dark area exists in the display area of the display component 100.

For example, at the light emission side of the lens strip, the angle formed between the lens strip and the display surface of the display component 100 ranges from 90° to 120°.

Here, at the light emission side of the lens strip, the angle formed between the lens strip and the display surface of the display component 100 ranges from 90° to 120°, which refers to a fact that at the light emission side of the lens strip, the angle formed between the display surface of the display component 100 and a connection line between an uppermost end portion and a lowermost end portion of the lens strip ranges from 90° to 120°.

In the embodiments of the present disclosure, at the light emission side of the lens strip, the angle formed between the lens strip and the display surface of the display component 100 ranges from 90° to 120°, which may further improve the uniformity of the overall display effect.

For example, as shown in FIG. 14(*a*), the first microstructure 511 includes a plane between which and a thickness direction of the lens strip there is provided with an included angle ranging from 0° to 60°, and the first microstructure 511 further includes a curved surface that is in contact with the plane adjacent to the curved surface and bulges in the third direction. The second microstructure 531 includes a plane between which and the thickness direction of the lens strip there is provided with an included angle ranging from 0° to 60°, and the second microstructure 531 further includes a curved surface that is in contact with the plane adjacent to the curved surface and bulges in the fourth direction (the figure only shows a structure where the included angle formed between the plane and the thickness direction of the lens strip is 0°). That is, the first microstructure 511 includes a plurality of parallel-arranged ridges (e.g., a ¼ cylinder), and the third microstructure 531 includes a plurality of parallel-arranged ridges (e.g., a ¼ cylinder).

In the embodiments of the present disclosure, after the light incident onto the surface of the first microstructure 511 is emitted from the lens strip, the light may shine onto a portion of the display area closer to the light source 32, and the light incident onto the curved surface of the first microstructure 511 that bulges in the third direction is emitted from the lens strip, which may reduce the intensity of the light received by the portion of the display area closer to the light source 32. On this basis, in the case that the surface of the extension portion 24, which is opposite to the display surface and is close to the display component 100 may reflect light, the light emitted from the curved surface bulging in the third direction may also be reflected on the surface of the extension portion 24, which is opposite to the display surface and is close to the display component 100, and shine onto the middle portion of the display area of the display component 100 and a portion farther away from the first frame strip 21. In the case that the surface of the extension portion 24 which is opposite to the display surface and is close to the display component 100 may reflect light, the light incident onto the plane of the second microstructure 531 may be reflected on the surface of the extension portion 24, which is opposite to the display surface and is close to the display component 100, and may shine onto the middle portion of the display area of the display component 100 and the portion farther away from the first frame strip 21. The light incident onto the curved surface of the second microstructure 531 bulging in the fourth direction is emitted from the frame strip, and may shine onto the middle portion of the display area of the display component 100 and the portion farther away from the first frame strip 21. Based on the above description, on the basis of improving the light utilization efficiency, the uniformity of the overall display effect of the display component 100 may be improved, and reference may be made to FIG. 14(*b*) for the simulation results thereof.

For example, as shown in FIG. 14, a light incident surface 54 of the lens strip is composed of a plurality of hemispherical surfaces protruding toward the first direction or the second direction. Alternatively, the light incident surface 54 of the lens strip is composed of a plurality of strip-shaped curved surfaces protruding toward the first direction or the second direction.

In the embodiments of the present disclosure, in most cases, the light incident onto the lens strip is collimated light. Therefore, by designing the light incident surface 54 of the lens strip to be a hemispherical surface or a curved surface, the light incident surface 54 of the lens strip may have an effect of homogenizing light, such that the light is incident onto the lens strip from all directions.

An embodiment of the present disclosure provides a plastic frame component, which includes the frame 20 and the optical path adjuster 31 according to any one of the preceding embodiments.

The plastic frame component may further include the light source 32 according to any one of the preceding embodiments. The light source 32 may provide light to the plastic frame component, and light emitted from the light source 32 may shine onto the optical path adjuster 31 and may be adjusted by the optical path adjuster 31.

An embodiment of the present disclosure provides a plastic frame component. The optical path adjuster 31 is arranged on the first frame strip 21 of the plastic frame component, wherein the optical path adjuster 31 may adjust light. When the plastic frame component is applied to a total reflection display device, each frame strip of the plastic frame component may be positioned on a side of the display component 100 of the total reflection display device, such that the light adjusted by the optical path adjustment element 31 may shine onto the display area of the display component 100. Next, the light is reflected by the reflective layer in the display component 100, and the light reflected by the reflective layer is emitted from the display component 100 to display. Each frame strip of the plastic frame component is arranged on a side of the display component 100, not like the front light guide plate in the related art where an entire layer of frame strips is arranged on the display surface of the display component 100. Therefore, the present disclosure facilitates the thin design of the total reflection display device as compared with the related art.

The above is merely specific embodiments of the present disclosure, but the protection scope of the present disclosure is not limited thereto. Any variation or substitution easily conceivable to those skilled in the art shall fall into the protection scope of the present disclosure. Therefore, the protection scope of the present disclosure shall be subject to the protection scope of the claims.

What is claimed is:

1. A plastic frame component for matching up with a total reflection display component to form a total reflection display device, comprising:
   a first frame strip configured to match with a side edge of the display component to support the display component;
   a light source on the first frame strip and configured to emit light; and
   an optical path adjuster on the first frame strip and between the light source and the total reflection display component, wherein:
   the first frame strip comprises a first portion, the first portion accommodates the light source and the optical path adjuster, and the first portion protrudes from the side edge of the display component and goes beyond a display surface of total reflection display component after the plastic frame component is assembled with the total reflection display component such that the light emitted by the light source shines onto a display area of the display component after being adjusted by the optical path adjuster;
   at least one of:
   (a) the first frame strip further comprises a second portion connected to the first portion, the first portion and the second portion form an optical channel configured to transmit light, a first end of the optical channel is on a side wall of the first portion facing toward a side of the display component, a second end of the optical channel is positioned in the second portion, the light source is at the second end of the optical channel, and the optical path adjuster is at the first end of the optical channel; and
   (b) the first portion has an extension portion extending from a position at which the optical path adjuster is fixed to a first direction, a surface of the extension portion opposite to the display surface is configured to reflect the light emitted from the light source, and the first direction is a direction in which a non-display area of the display component directs to the display area.

2. The plastic frame component according to claim 1, wherein:
   the optical channel comprises an optical cavity and a reflective layer covering a surface of the optical cavity;
   an opening of the optical cavity is on a side wall of the first portion facing toward a side of the display component;
   the optical cavity extends from the opening to a bottom end of the second portion.

3. The plastic frame component according to claim 1, further comprising at least one second frame strip, wherein:
   an upper end portion of the second frame strip goes beyond the display surface of the display component after the plastic frame component is assembled with the display component;
   a second angle formed between a side wall in the upper end portion of the second frame strip adjacent to the display component and the display surface is an acute angle; and
   the side wall in the upper end portion of the second frame strip adjacent to the display component is configured to reflect the light emitted by the light source.

4. The plastic frame component according to claim 3, wherein the side wall in the upper end portion of the second frame strip adjacent to the display component is a recessed curved surface.

5. The plastic frame component according to claim 1, wherein:
   the optical path adjuster is a lens strip and, at a light emission side of the lens strip, an angle formed between the lens strip and the display surface of the display component is an obtuse angle; and the lens strip is shaped like an arch rising in the first direction.

6. The plastic frame component according to claim 5, wherein, at the light emission side of the lens strip, an angle formed between the lens strip and the display surface of the display component ranges from 90° to 120° approximately.

7. The plastic frame component according to claim 1, wherein:

the optical path adjuster is a lens strip and, at a light emission side of the lens strip, an angle formed between the lens strip and the display surface of the display component is greater than or equal to 90°;

a light emission surface of the lens strip has a first strip region, a second strip region, and a third strip region in a third direction;

the light emission surface of the lens strip has a plurality of strip-shaped first microstructures in a portion of the first strip region;

the light emission surface of the lens strip is a curved surface protruding in the first direction in a portion of the second strip region;

the light emission surface of the lens strip has a plurality of strip-shaped second microstructures in a portion of the third strip region, wherein the first microstructure is configured to deflect a portion of incident light rays in the third direction, and the second microstructure is configured to deflect a portion of the incident light rays in a fourth direction; and the first direction is a direction in which the non-display area of the display component directs to the display area, the third direction is a direction in which a back surface of the display component directs to the light emission surface, and the fourth direction is opposite to the third direction.

8. The plastic frame component according to claim 7, wherein at the light emission side of the lens strip, a third angle formed between the lens strip and the display surface of the display component ranges from 90° to 120°.

9. The plastic frame component according to claim 7, wherein:

the first microstructure comprises a plane and a thickness direction of the lens strip there is provided with an included angle ranging from 0° to 60°;

the first microstructure further comprises a curved surface that is in contact with the plane adjacent to the curved surface and bulges in the third direction;

the second microstructure comprises a plane and the thickness direction of the lens strip there is provided with an included angle ranging from 0° to 60°; and the second microstructure further comprises a curved surface that is in contact with the plane adjacent to the curved surface and bulges in the fourth direction.

10. The plastic frame component according to claim 7, wherein:

a light incident surface of the lens strip is composed of a plurality of protruded hemispherical surfaces or, the light incident surface of the lens strip is composed of a plurality of strip-shaped curved surfaces protruding toward the first direction or the second direction; and the second direction is opposite to the first direction.

11. The plastic frame component according to claim 1, wherein:

the number of the first frame strip is one; or the number of the first frame strips is two, and two first frame strips are positioned on two opposite sides of the display component.

12. The plastic frame component according to claim 11, wherein:

if the display component is a rectangular display component, the first frame strip matches up with a shorter edge of the rectangular display component; or the two first frame strips match up with two shorter edges of the rectangular display component.

13. The plastic frame component according to claim 1, wherein:

the optical path adjuster is a lens strip and, at a light emission side of the lens strip, an angle formed between the lens strip and the display surface of the display component is an obtuse angle; and the lens strip comprises a first sub-lens strip and a second sub-lens strip positioned on a side of the first sub-lens strip away from the display component, the first sub-lens strip is shaped like an arch rising in a second direction, and the second sub-lens strip is shaped like an arch rising in the first direction; and the second direction is opposite to the first direction.

14. A total reflection display device, comprising:

a total reflection display component having a display surface configured to render an image; and a plastic frame component, comprising:

a first frame strip configured to match with a side edge of the display component to support the display component;

a light source on the first frame strip and configured to emit light; and an optical path adjuster on the first frame strip and between the light source and the total reflection display component, wherein:

the first frame strip comprises a first portion, the first portion accommodates the light source and the optical path adjuster, and the first portion protrudes from the side edge of the display component and goes beyond a display surface of total reflection display component after the plastic frame component is assembled with the total reflection display component such that the light emitted by the light source shines onto a display area of the display component after being adjusted by the optical path adjuster;

the first frame strip further comprises a second portion connected to the first portion;

the first portion and the second portion form an optical channel configured to transmit light;

a first end of the optical channel is on a side wall of the first portion facing toward a side of the display component, and a second end of the optical channel is positioned in the second portion;

the light source is at the second end of the optical channel; and the optical path adjuster is at the first end of the optical channel.

15. A total reflection display device, comprising:

a total reflection display component, having a display surface configured to render an image; and a plastic frame component, comprising:

a first frame strip configured to match with a side edge of the display component to support the display component;

a light source on the first frame strip and configured to emit light; and an optical path adjuster on the first frame strip and between the light source and the total reflection display component, wherein:

the first frame strip comprises a first portion and a second portion connected to the first portion;

the first portion accommodates the light source and the optical path adjuster;

the first portion protrudes from the side edge of the display component and goes beyond a display surface of total reflection display component after the plastic frame component is assembled with the total reflection display component such that the light emitted by the light source shines onto a display area of the display component after being adjusted by the optical path adjuster;

the first portion has an extension portion extending from a position at which the optical path adjuster is fixed to a first direction, and a surface of the extension portion opposite to the display surface is configured to reflect the light emitted from the light source; and the first direction is a direction in which a non-display area of the display component directs to the display area.

* * * * *